United States Patent [19]
Campos et al.

[11] 4,120,620
[45] Oct. 17, 1978

[54] ROTARY INTERNAL COMBUSTION ENGINE

[75] Inventors: Adolph A. Campos, Newark; Joseph V. Michele, Nutley, both of N.J.

[73] Assignee: Campos Associates, Summit, N.J.

[21] Appl. No.: 749,642

[22] Filed: Dec. 10, 1976

[51] Int. Cl.² ........................ F01C 1/02; F01C 17/02; F02B 55/14
[52] U.S. Cl. .................... 418/61 A; 418/83; 418/182
[58] Field of Search .................. 418/61 A, 182, 83; 123/8.45

[56] References Cited
U.S. PATENT DOCUMENTS

| 813,018 | 2/1906 | Okun | 418/182 |
|---|---|---|---|
| 3,054,357 | 9/1962 | McGill | 418/182 |
| 3,173,406 | 3/1965 | Campos | 418/61 A |

FOREIGN PATENT DOCUMENTS 1,551,124  1/1970  Fed. Rep. of Germany ........ 418/61 A Primary Examiner—John J. Vrablik

[57] ABSTRACT

This invention relates to a rotary internal combustion engine operating on the four-stroke cycle: intake, compression, combustion and exhaust and the utilization of a star-shaped eccentric for converting the rotation of the rotor to driving the mainshaft.

8 Claims, 8 Drawing Figures

FIG. 1
FIG. 2
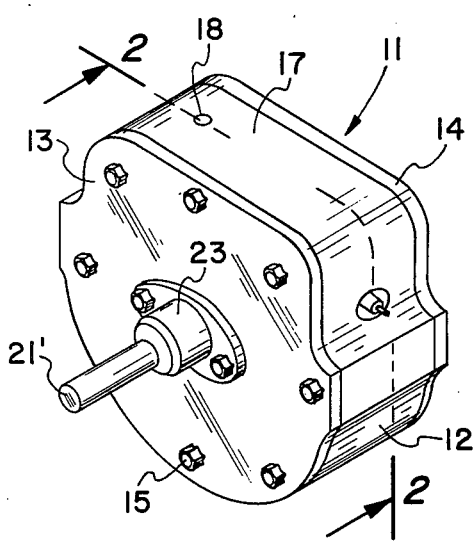
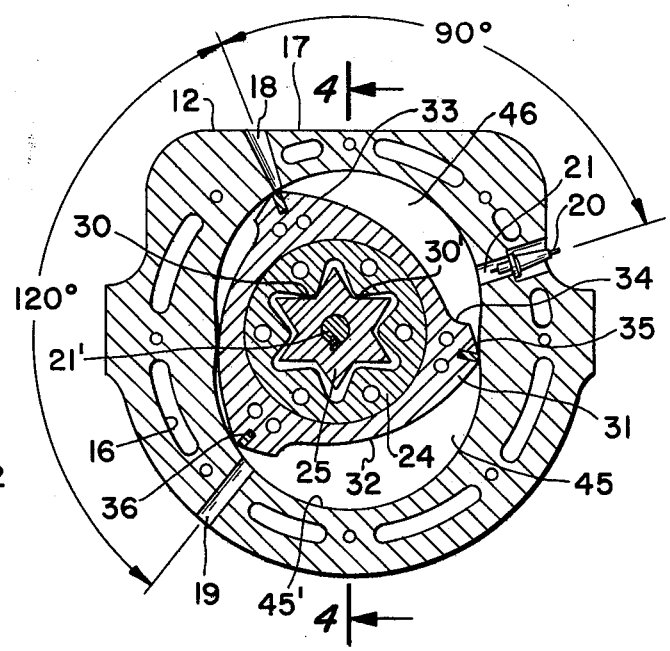
FIG. 4
FIG. 3
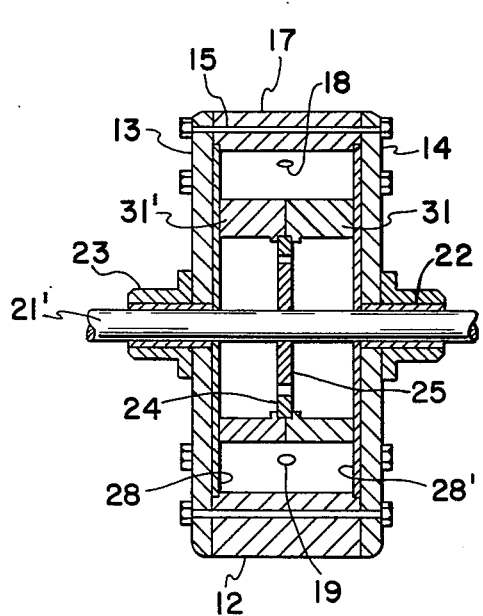
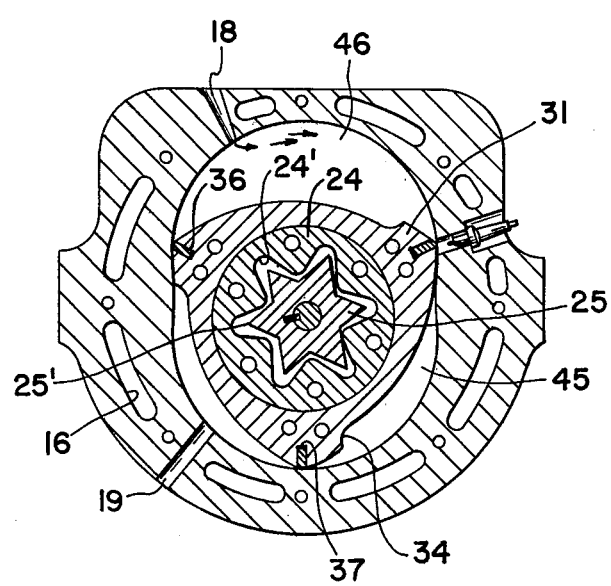

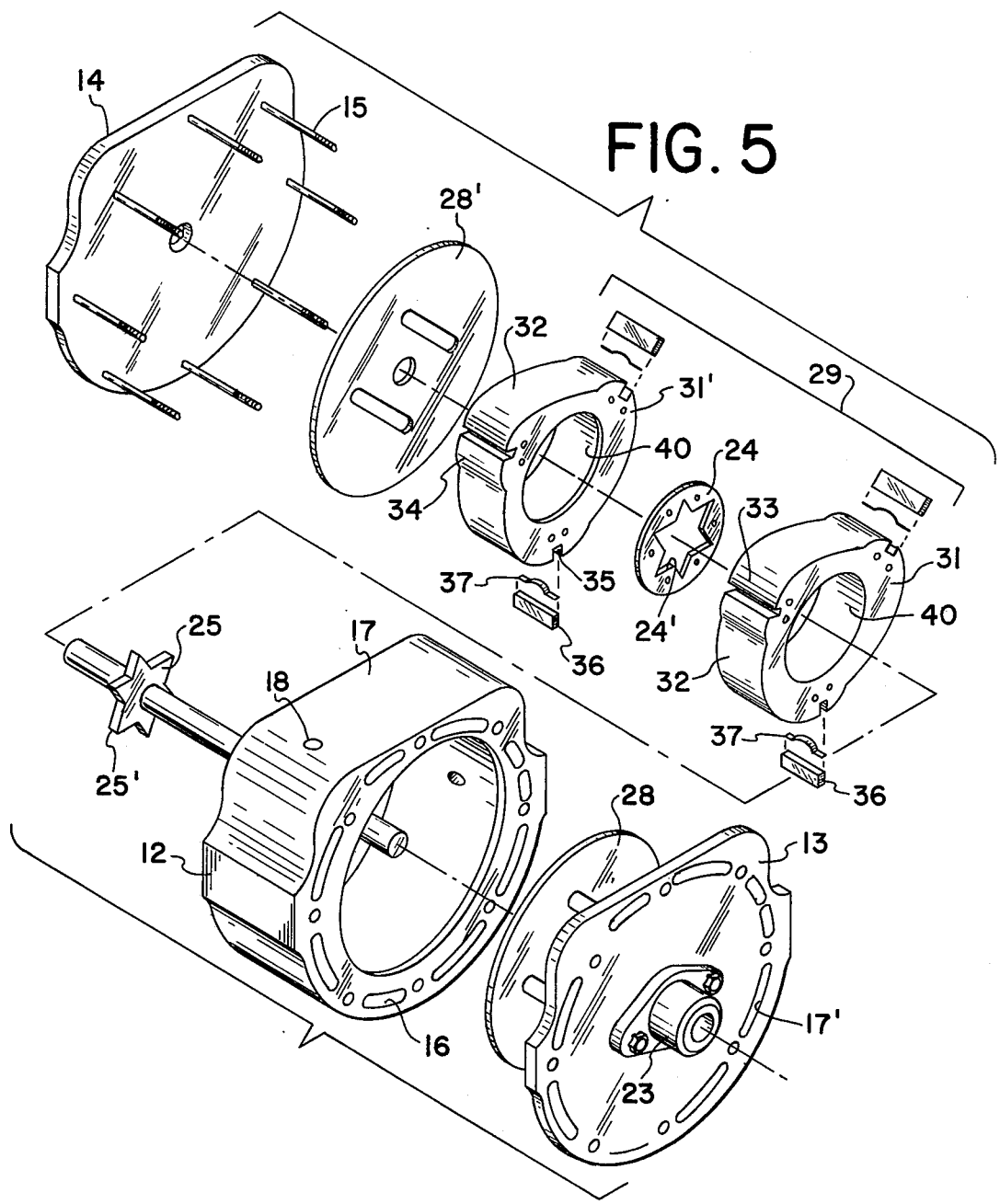

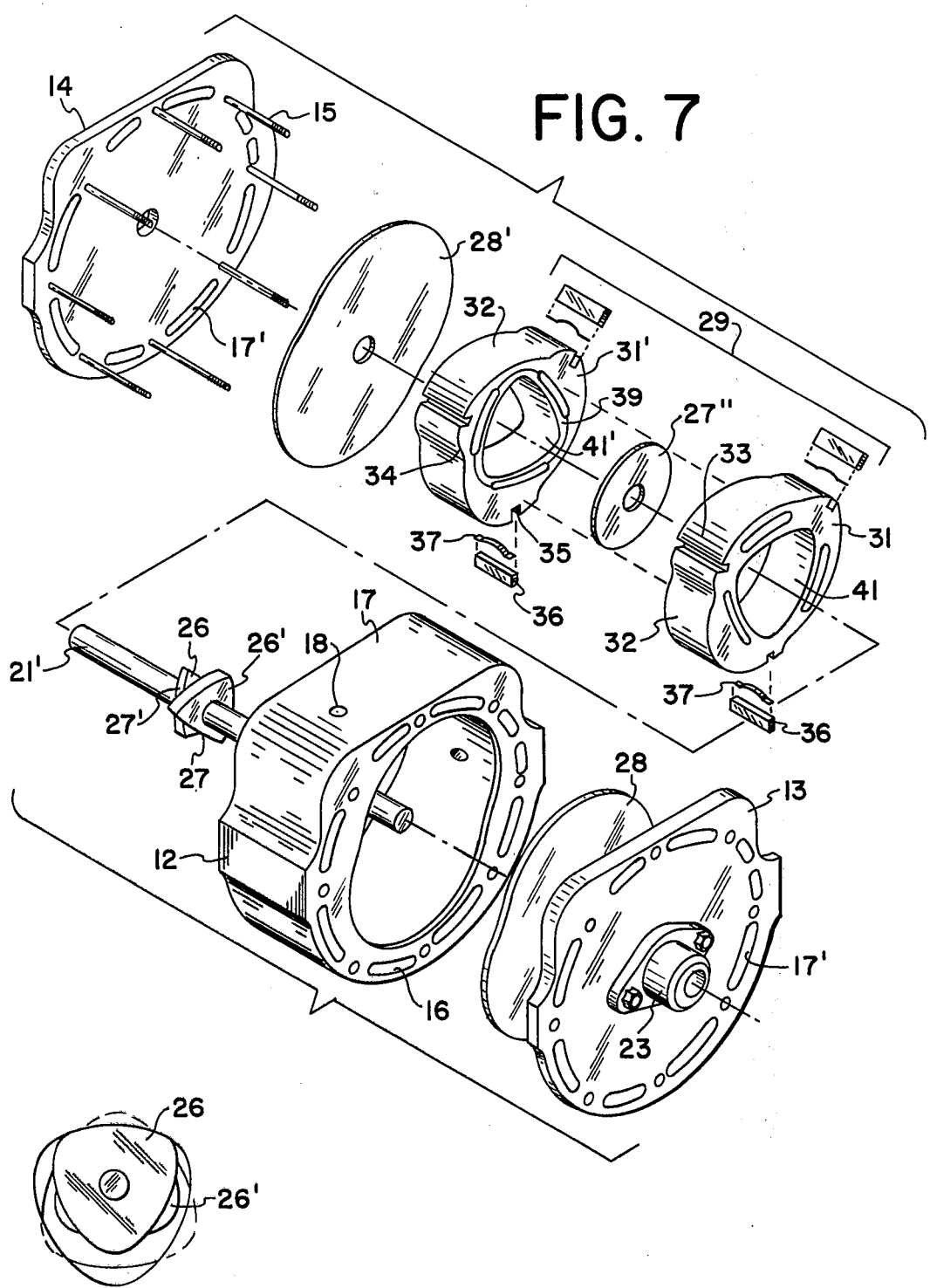

ROTARY INTERNAL COMBUSTION ENGINE

GENERAL BACKGROUND OF THE INVENTION

This invention relates to improvements in internal combustion engines, and more particularly to an improved internal combustion engine which uses a three-sided rotor and which develops three power impulses per revolution, all in the same direction.

In U.S. Pat. No. 3,193,406 issued to me there is disclosed a rotary internal combustion agent utilizing as its driving means an equilateral triangle shaped drive bar which is centered so that its axis coincides with the axis of the mainshaft. This bar corresponds with a triangular aperture in the rotor. This configuration gives a drive impulse for each sixty degrees of motion of the rotor. Although this is a generally efficient coupling, the motion lacks the smoothness of operation attained by the present invention which gives a substantially superior smooth flow of motion from each part of the rotation.

GENERAL PURPOSES AND OBJECTS OF THE INVENTION

A main object of the invention is to provide a novel and improved rotary internal combustion engine which is relatively simple in construction, which is compact in size, which is relatively light in weight and which develops a relatively high power output with minimum consumption of fuel.

A further object of the invention is to provide an improved rotary internal combustion engine of the type employing a three-sided rotor, the engine being relatively inexpensive to manufacture, being durable in construction and involving only a few parts.

A still further object of the invention is to provide an improved rotary internal combustion engine which is relatively inexpensive to manufacture, which requires a relatively small amount of maintenance, which is reliable in operation, and which is economical in fuel consumption.

A still further object of the invention is to provide an improved rotary internal combustion engine of the type employing a three-sided rotor, the engine developing three power impulses per revolution, all in the same direction, said engine being smooth in operation.

BRIEF DESCRIPTION OF THE DRAWINGS

FIG. 1 is a perspective view of an improved rotary internal combustion engine constructed in accordance with the present invention.

FIG. 2 is an enlarged vertical cross-sectional view taken substantially on the line 2—2 of FIG. 1.

FIG. 3 is a vertical cross sectional view, similar to FIG. 2, but showing the rotor in a position wherein fuel is being admitted into the compression chamber of the engine, the rotor being in a position advanced relative to the position thereof shown in FIG. 2.

FIG. 4 is a vertical cross sectional view taken on the line 4—4 FIG. 1.

FIG. 5 is a perspective view of the elements comprising the engine of FIGS. 1 to 4, said elements being shown in separated positions.

FIG. 6 is a cross sectional view of a second type of drive element comprising dual triangular eccentrics.

FIG. 7 is a perspective view of the elements similar to FIG. 5 shown in separated position utilizing dual triangular eccentrics of FIG. 6 and corresponding chambers for receiving the eccentrics.

DETAILED DESCRIPTION OF THE INVENTION

Figure 8:
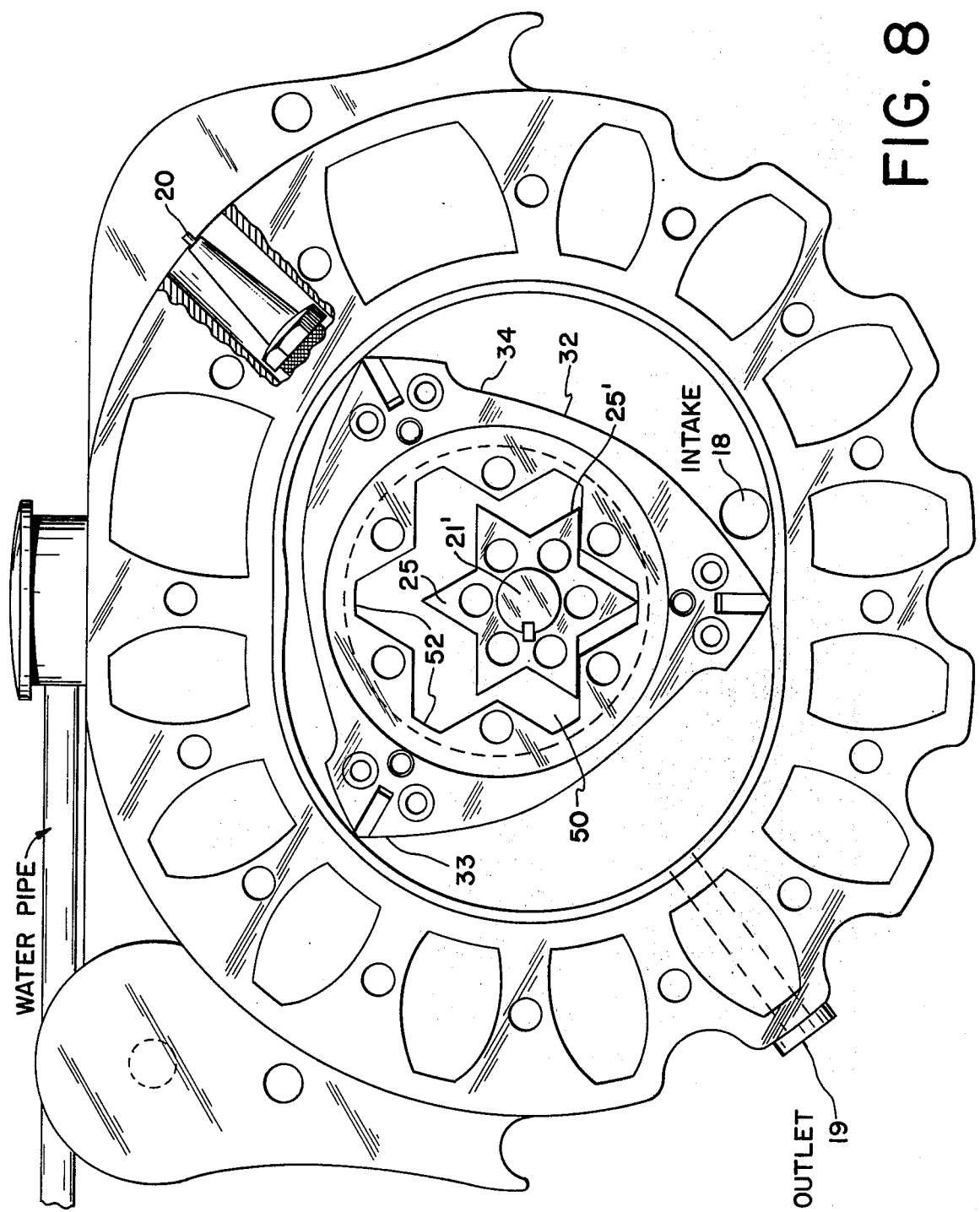
FIG. 8 is a vertical cross sectional view, similar to FIG. 2, showing a different configuration for the aperture in the rotor.

Referring to the drawings, 11 generally designates an improved rotary combustion engine constructed in accordance with the present invention. The engine 11 comprises a main housing consisting of a generally annular main body 12 and a pair of opposite side plates 13 and 14 of similar shape secured to the opposite sides of the main body 12, as by means of longitudinally extending fastening bolts 15. The main body 12 is formed with a plurality of circularly arranged cooling slots 16, whereby to provide continuous channels for the circulation of cooling liquid through the peripheral portions of the engine.

The engine is substantially flattened at its top portion, as shown at 17, and the flattened top portion 17 of the main body 12 of the engine is formed with a downwardly convergent fuel intake port 18 to which may be connected a suitable fuel supply conduit, not shown, which may be connected to a suitable source of a combustible gas mixture. As shown in FIG. 2, the downwardly convergent fuel intake port 18 is located at one side of the top wall of the engine. The engine is formed at its bottom wall with an exhaust port 19 which is located at the same side thereof as the fuel intake port 18, being spaced therefrom by an angle of approximately 120° of rotation, as shown in FIG. 2.

Mounted in the wall of the main body 17 of the engine and angularly spaced from the fuel intake port 18 by an angle of approximately 90° in a clockwise direction, as viewed in FIG. 2, is a spark plug 20 whose electrodes terminate in an axial bore 21 communicating with the interior of the engine, as shown in FIG. 2, for igniting fuel mixture in the upper portion of the engine cavity subsequent to compression thereof, as will be presently explained. The spark plug 20 is energized from a suitable ignition system which is suitably synchronized so as to deliver a spark in the ignition space 21 near the end of the compression portion of the cycle of rotation of the engine rotor, as will be presently explained. The details of the distributor and associate ignition system for energizing the spark plug 20 are conventional in themselves and form no part of the present invention.

Axially journaled in the engine is a mainshaft 21' which is rotably supported on suitable sleeve bearings 22 mounted in annular end bushings 23 secured to the central portions of the side plates 13 and 14, as shown in FIG. 4. At an intermediate portion of the mainshaft 21' is integrally formed with or has rigidly secured thereon a gear 25 in the form of a six-pointed star with generally rounded points as indicated at 25', and which is centered so that the axis coincides with the axis of the shaft 21'. These intermediate positions can be an integral part of the shaft 21' or a separate piece secured thereto such as by keying. The rotor is generally three-sided in shape and formed of two sections 31 and 31' and is formed with three identical curved peripheral surfaces 32 which have trailing ends 33 of maximum radius and which diminish gradually in radius toward their leading ends. The radius reaches a minimum adjacent the leading end of the side, after which the radius increases rapidly in value, defining an arcuately curved thrust shoulder 34 at the leading end of the side 32 of the rotor.

The rotor 29 is formed at the junction between the leading and trailing ends of its respective sides 32 with radially extending longitudinal slots 35 in which are slidably positioned respective longitudinally extending sealing bars 36 which are biased outwardly into sealing contact with the inside wall of the cavity of body 17 by bowed leaf springs 37 disposed in the bottoms of the grooves or slots 35. The circular plate member 27" is secured in circular recess 39 formed in the inner sides of the rotor sections 31 and 31' concentrically with its axis and the rotor 29, as shown in FIG. 7.

The rotor 29 is formed centrally with a circular aperture 41. A plate 24 fits into the circular aperture 41. The plate 24 has a centrally located six-pointed star shape aperture 24' to receive the gear 25 but which is substantially larger in size than the gear 25 received therein, but is of such size as to prevent complete rotation of gear 25 therein. As shown in FIG. 3 a substantial amount of clearance is provided between the faces of the gear 25 and inside faces of the aperture 24'. The rotor is also allowed to move somewhat horizontally and vertically relative to the shaft 21'. The construction of the star-shaped aperture 24' is such that the gear 25 only contacts the aperture at two points 30, 30' on each side of common star point at any one time. As the rotor 31, 31' revolves in an eccentric motion, it causes the star aperture 34' of the plate 24 to contact successive adjacent points of the gear 25.

The lower portion 45 of the cavity defined in the generally annular main body of the engine is of substantially constant radius 45'. The upper portion 46 of the cavity is at a radial distance from the center of said lower portion 45 greater than the radius of said lower portion, and the arcuate side portions of the cavity converge smoothly toward said upper portion, as is clearly shown in FIGS. 2 and 3. Thus, the cavity is shaped so as to be somewhat vertically elongated, with a generally semi-cylindrical lower portion and an upper portion having upwardly convergent sides. Since there is some play between the star-shaped gear 25 and the inside faces of aperture 24' of plate 24', the rotor can assume a position, such as that shown in FIG. 3 wherein the center of the rotor has moved below the center of the shaft and such that the distance from the center of the shaft to the upper right hand seal 36 in FIG. 3 is slightly less than the distance to the lower seal 36, the differential in distance providing a differential surface on which combustion pressure in the space immediately below said upper right hand seal can act to produce rotations of the rotor. Because of the upward convergency of the sides of the upper portion of the cavity, as above noted, and as is clearly shown in FIG. 3, the upper seals 36 act as follower members cooperating with said convergent sides to depress the rotor to the position of FIG. 3. This action causes the rotor to at times assume a depressed position providing a differential of radial between the center of the shaft 21' and the portion of the peripheral surfaces at opposite sides of the ignition 20.

DESCRIPTION OF OPERATION

In operation, combustible fuel mixture is admitted into the upper space 46 of the engine, assuming the port 18 to be in communication with the super space, namely, the rotor to be in a position such as that illustrated in FIG. 3. With the rotor rotating in a clockwise direction, as viewed in FIG. 3, the upper left sealing bar 36 eventually passes upwardly beyond the sealed intake port 18, namely, passes the position thereof illustrated in FIG. 2, after which the gaseous fuel mixture admitted into the space 46 undergoes compression as the volume thereof is reduced, namely, as the rotor rotates clockwise beyond the position thereof illustrated in FIG. 2. When the rotor reaches the position shown in FIG. 3, the fuel is in the lower right space and is under maximum compression, at which point ignition takes place, and the fuel is ignited by the spark plug 20. The expansion of the ignited fuel develops a power stroke on the aforesaid differential surface. As above mentioned, the rotor is urged to the depressed position of FIG. 3 by the cooperation of the upper seals 36 with the upwardly convergent sides of the cavity. Therefore, the rotor will receive a power impulse tending to rotate the rotor clockwise with each ignition of the compressed fuel by the spark plug 20. The power impulse will be furnished by the expanding gaseous products of combustion acting against the aforesaid differential surface.

Subsequent to the delivery of the power impulse to the rotor, the gaseous products of combustion are placed in communication with the exhaust port 19, through which they discharge to the atmosphere. Thus, in the position of the rotor shown in FIG. 2, the gaseous products of combustion in the lower space of the engine cavity are placed in communication with the discharge port 19, and are allowed to escape, after delivery of the thrust impulse to the rotor. The above described cycle is repeated three times for every revolution of the rotor, so that three power impulses are developed for each revolution thereof.

Following impulses applied to the rotor are transmitted to the shaft 21' through the resilient coupling defined between the star-shaped gear 25 and the star-shaped aperture 24' in the rotor which permit relative momements between rotor 31 and 31' respectively and the portions 25 and 24' in the manner above described.

It will be noted that the respective sides of the star-shaped aperture 24' in the rotor sections 31 and 31' are substantially parallel to the sides of the rotor, namely, to the surfaces defined between respective pairs of contact bars 36, 36. Thus, when the gas mixture is ignited in the space 45, the resultant explosion develops a force which may be resolved in a direction perpendicular to the adjacent straight side of aperture 24' of the rotor, causing the rotor to be urged toward the corresponding contact points 27, 27' of the aperture 24' and gear 25.

A second modification of the device is shown in FIGS. 6 and 7. In this modification the intermediate portion of the mainshaft 21' is integrally formed with, or has rigidly secured thereon, two intermediate portions 26' and 26" generally triangular in shape which have slightly convex sides 27 and 27' and which is centered so that each axis coincides with the axis of the shaft 21'. These intermediate positions can be an integral part of the shaft 21' or a separate piece secured thereto such as by keying. A spacer disk 27" separates these two intermediate portions from one another and is for the purpose of keeping the rotation steady so the same pressure is exerted on each intermediate portion. The spacer disc 27" is allowed to rotate freely from the shaft and is recessed into rotor portion 31. The rotor 29 is formed centrally with a triangular aperture 41 and 41' in each section 31 and 31' which is in the shape of an equilateral triangle and which is substantially larger in size than the triangular body 24 received therein, but is of such size as to prevent complete rotation of body 24 therein. A substantial amount of clearance is provided between the faces of the body and inside faces of the aperture 41. The rotor is also allowed to move somewhat horizontally relative to the shaft body 24.

In the configuration of FIGS. 6 and 7 following impulses applied to the rotor are transmitted to the shaft 21' through the resilient coupling defined between the dual triangular shaft portions 26 and 26' and the dual triangular aperture 41 and 41' offset from one another to form a six sided star configuration, in the rotor which permit relative movement between rotor 31 and 31' respectively and the portions 25 and 25' in the manner above described.

A third modification of the device is shown in FIG. 8. In this modification the plate 24 shown in FIG. 2 has an aperture 50 in the form of a six-pointed star with each point truncated leaving a flat top or base 52.

While a specific embodiment of an improved rotary combustion engine has been disclosed in the foregoing description, it will be understood that various modifications within the spirit of the invention may occur to those skilled in the art. Therefore, it is intended that no limitations be placed on the invention except as defined by the scope of the following claims.

What is claimed is:

1. In a rotary combustion engine comprising a main housing formed with a generally oval vertically elongated rotor cavity comprising a substantially semi-cylindrical lower portion, an arcuate top portion at a radial distance from the center of said lower portion greater than the radius of said lower portion, and arcuate upwardly convergent side portions smoothly connecting said arcuate top (tip) portion and substantially semi-cylindrical lower portion, said cavity having a fuel intake port communicating with the cavity at one side of said top portion, fuel ignition means in the cavity adjacent the opposite side of said top portion, said cavity being provided with a peripheral exhaust port in said lower portion at the same side of the cavity as said intake port, a shaft journaled in the housing with its axis displaced from said center toward said arcuate top portion, a rotor having a periphery comprising three successive sides of similar shape, means for supporting said rotor on said shaft and respective sealing members on the periphery of said rotor between its successive sides sealing engaging the peripheral surface of said rotor cavity and cooperating with said convergent side portions to cause the rotor to at times assume a depressed position providing a differential of radial distance between the center of the shaft and the portion of said peripheral surface at opposite sides of the ignition means engaged by two successive sealing members whereby to define differential in distance providing a differential surface on which combustion pressure in the space immediate adjacent one of said sealing members to provide a thrust (surface) on the rotor, the improvement which comprises utilizing as said rotor a rotor having a star-shaped aperture, said aperture loosely receving an intermediate portion of said shaft.

2. In a rotary combustion engine comprising a main housing formed with a generally oval vertically elongated rotor cavity comprising a substantially semi-cylindrical lower portion, an arcuate top portion at a radial distance from the center of said lower portion greater than the radius of said lower portion, and arcuate upwardly convergent side portions smoothly connecting said arcuate top portion and substantially semi-cylindrical lower portion, said cavity having a fuel intake port communicating with the cavity at one side of said top portion, fuel ignition means in the cavity adjacent the opposite side of said top portion, said cavity being provided with a peripheral exhaust port in said lower portion at the same side of the cavity as said intake port, a shaft journaled in the housing with its axis displaced from said center toward said arcuate top portion, a rotor having a periphery comprising successive sides of similar shape, means for supporting said rotor on said shaft and respective sealing members on the periphery of said rotor between its successive sides sealing engaging the peripheral surface of said rotor cavity and cooperating with said convergent side portions to cause the rotor to at times assume a depressed position providing a differential of radial distance between the center of the shaft and the portion of said peripheral surface at opposite sides of the ignition means engaged by two successive sealing members whereby to define a differential in distance providing a differential surface on which combustion pressure in the space immediate adjacent to one of said sealing members to provide a thrust on the rotor, the improvement which comprises utilizing as said shaft a shaft having a star-shaped gear positioned on said shaft within said rotor and said rotor having a star-shaped aperature for receiving said star-shaped gear and said star-shaped gear being sufficiently large in size so that it cannot rotate within said star-shaped aperature.

3. The rotary combustion engine of claim 1 wherein said star-shaped gear is six sided.

4. The rotary combustion engine of claim 1 wherein said star-shaped gear comprises two similarly shaped triangular shaped gears.

5. In a rotary combustion engine comprising a main housing formed with a generally oval vertically elongated rotor cavity comprising a substantially semi-cylindrical lower portion, an arcuate top portion at a radial distance from the center of said lower portion greater than the radius of said lower portion, and arcuate upwardly convergent side portions smoothly connecting said arcuate top portion and substantially semi-cylindrical lower portion, said cavity having a fuel intake port communicating with the cavity at one side of said top portion, fuel ignition means in the cavity adjacent the opposite side of said top portion, said cavity being provided with a peripheral exhaust port in said lower portion at the same side of the cavity as said intake port, a shaft journaled in the housing with its axis displaced from center toward said arcuate top portion, a rotor having a periphery comprising three successive sides of similar shape means for supporting said rotor on said shaft and respective sealing members on the periphery of said rotor between its successive sides sealing engaging the peripheral surface of said rotor cavity and cooperating with said convergent side portions to cause the rotor to at times assume a depressed position providing a differential of radial distance between the center of the shaft and the portion of said peripheral surface at opposite sides of the ignition means engaged by two successive sealing members whereby to define a differential in distance providing a differential surface on which combustion pressure in the space immediate adjacent one of said sealing members to provide a thrust on the rotor, the improvement which comprises utilizing as said shaft a shaft having a six-sided star-shaped gear positioned within said rotor and said rotor having a six-pointed star-shaped aperture loosely receiving said gear to permit eccentric motion of said rotor while the rotation of said rotor drives said gear.

6. In a rotary combustion engine comprising a main housing formed with a generally oval elongated rotor cavity comprising a subatantially semi-cylindrical lower portion, an arcuate top portion at a radial distance from the center of said lower portion greater than the radius of said lower portion, and arcuate upwardly convergent side portions smoothly connecting said arcuate top portion and substantially semi-cylindrical lower portion, said cavity having a fuel intake port communicating with the cavity at one side of said top portion, fuel ignition means in the cavity adjacent the opposite side of said top portion, said cavity being provided with a peripheral exhaust port in said lower portion at the same side of the cavity as said intake port, a shaft journaled in the housing with its axis displaced from said center toward said arcuate top portion, a rotor having a periphery comprising three successive sides of similar shape, means for supporting said rotor on said shaft and respective sealing members on the periphery of said rotor between its successive sides sealing engaging the peripheral surface of said rotor cavity and cooperating with said convergent side portions to cause the rotor to at times assume a depressed position providing a differential of radial distance between the center of the shaft and the portion of said peripheral surface at opposite sides of the ignition means engaged by two successive sealing members whereby to define a differential in distance providing a differential surface on which combustion pressure in the space immediate adjacent one of said sealing members to provide a thrust on the rotor, the improvement which comprises utilizing as said means for supporting said rotor on said shaft a shaft having a six-sided star-shaped gear and utilizing as said rotor twin sections each having a circular aperture, a plate positioned in said circular aperture having a six-sided star-shaped aperture and loosely receiving said star-shaped gear so that said gear can not rotate in said star-shaped aperture.

7. The rotary combustion engine of claim 6 wherein said housing is connected to means for circulating coolant thereby cooling said housing.

8. The rotary combustion engine of claim 6 wherein said six-sided star-shaped aperture has trucated points.

* * * * *